Figure 1:
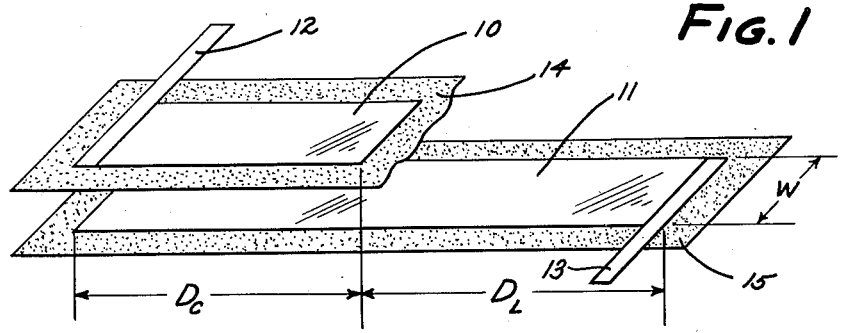

June 3, 1952     W. M. ALLISON     2,599,508

ELECTRICAL BANDPASS NETWORK

Filed April 8, 1947

WILLIAM M. ALLISON
INVENTOR

BY *Arthur G. Connolly*

ATTORNEY

Patented June 3, 1952

2,599,508

UNITED STATES PATENT OFFICE 2,599,508

ELECTRICAL BANDPASS NETWORK

William M. Allison, North Adams, Mass., assignor to Sprague Electric Company, North Adams, Mass., a corporation of Massachusetts Application April 8, 1947, Serial No. 740,251

2 Claims. (Cl. 178—44)

This invention relates to series resonant networks and more particularly refers to a series resonant network produced in a unitary assembly.

Series resonant networks consist of a series circuit containing inductance, capacitance and resistance. At a certain signal frequency, the series circuit or network will resonate and the impedance to current flow will be at a minimum. This frequency of resonance is equal to $$\frac{1}{2\pi\sqrt{LC}}$$

where L and C are the series inductance and series capacitance, respectively. Series resonant circuits and networks have the property of offering a relatively high impedance to current flow over two wide frequency ranges—on either side of the resonant frequency. Because of this, networks of this type are widely used as band-pass filters etc. and are made up by combining an inductance element such as a coil and a capacitance element, such as a paper or mica condenser. While such combinations in some cases are satisfactory, they possess the disadvantages of bulk, indeterminate added capacity and inductance caused by connecting and assembling the components, and expensive construction.

It is an object of this invention to overcome the foregoing and related disadvantages. A further object is to produce a novel unitary series resonant network. A still further object is to produce a unitary series resonant network with predeterminable frequency-impedance relations. Additional objects will become apparent from the following description and claims.

These objects are attained in accordance with the present invention which comprises in its general embodiment a pair of electrode foils of unequal length separated by dielectric spacing material and convolutely wound, terminals being provided at the start of the winding on the shorter foil and at the end of the winding on the longer foil.

In a more limited sense this invention is concerned with a series resonant network comprising two convolutely wound electrode foils separated by dielectric spacing material, one of said foils extending at least one turn beyond the other foil, a terminal element being provided at the outer extreme end of the longer foil and a terminal element being provided at the inner extreme end of the shorter foil.

In one of its preferred embodiments the invention is concerned with the foregoing structure wherein the longer foil extends in the winding a plurality of turns beyond the shorter foil, and advisably, but not necessarily, the terminal elements extend from opposite sides of the winding.

I have discovered that the use of wide foil electrodes in a spiral type winding will permit the fabrication of a series resonant network containing appreciable capacitance and appreciable inductance in series. According to my invention I convolutely wind two wide metal foils which are separated by suitable dielectric spacing material such as oil impregnated paper. I make one of the electrode foils substantially longer than the other so that an appreciable length of the foil extends beyond the end of the superposed foil portions. I provide a terminal element at the outer extremity of the longer foil, and also provide a terminal to the shorter foil which is at its inner extremity. My convolutely wound unit possesses appreciable capacity between the two electrode foils throughout the length and area of the short foil, which is, of course, superposed upon the longer foil, and possesses in series therewith, appreciable inductance provided by the extended spirally wound portion of the longer foil.

Figure 2:
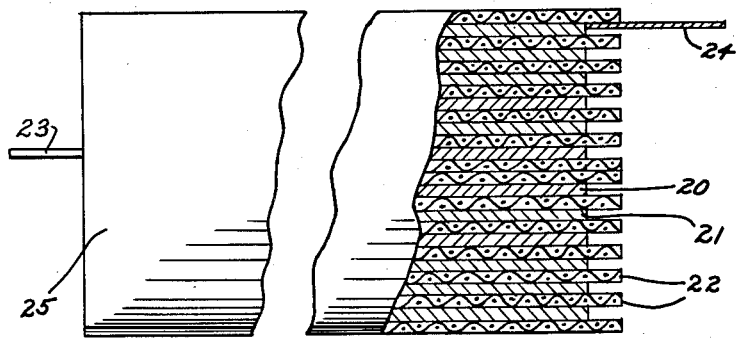
Figure 3:
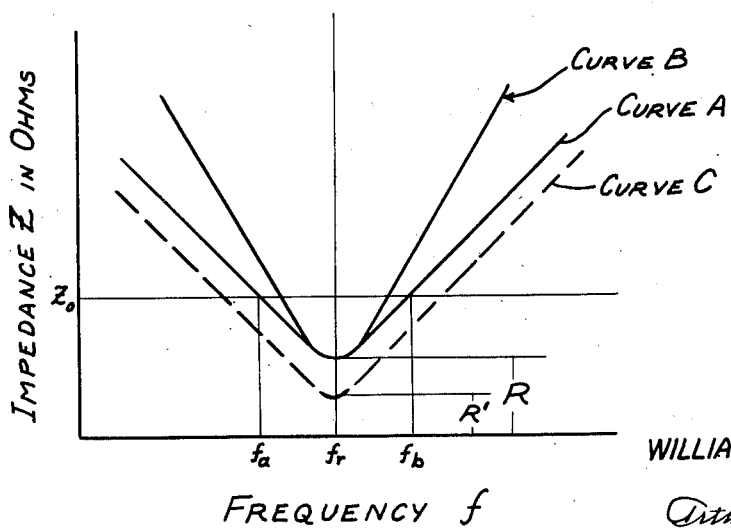

Reference now will be made to the appended drawing in which Figure 1 shows a laid out series resonant network, Figure 2 shows a partial cross-section of a completed unit and Figure 3 shows the frequency-impedance characteristics of the series resonant networks of my invention.

Referring more specifically to Figure 1, 10 and 11 represent flat electrode foils, the latter being appreciably longer than the former. These are separated by two dielectric spacers, 14, cut away in part for clarity, and 15.

Terminal 12 is affixed to one extremity of foil 10 and terminal 13 is affixed to the opposite extremity of foil 11. Generally, the shorter foil 10 is located at the inner end of the winding; thus terminal 12 would be at the inner extremity of the winding, while terminal 13 would be at the outer extremity.

$D_c$ represents the length of the winding in which electrical capacity is the predominant function, although, to be sure, a small amount of inductance and resistance are present. $D_L$ represents the length of the winding which predominantly contributes inductance to the network. These will be discussed below in greater detail, in connection with Figure 3. W represents the width of the electrode foils and is considered in a later paragraph.

Referring to Figure 2, a wound up network is shown, partially in cross-section. This is representative of the network produced by rolling the foils and spacers of Figure 1. 25 represents the body of the network, cut away in part for clarity. 20 is the shorter electrode foil and is superposed upon the first few (in this case, two) turns of the longer electrode foil 21. The foils 20 and 21 are separated by means of dielectric spacing material 22.

A terminal 23 is affixed to the inner extremity of short foil 20 and a terminal 24 is affixed to the outer extremity of long foil 21. It will be noted that foil 21 extends for a plurality of turns beyond short foil 20, in accordance with one of the preferred embodiments of my invention.

In Figure 3, the impedance Z of the network to the flow of current of different frequencies $f$ is plotted. Taking curve A as typical of a series resonant network such as shown in Figure 2, the impedance is lowest at the resonant frequency $f_r$ and possesses a value of R at this frequency. R is the pure series resistance in the network, due to the resistance of the foils, terminal elements, etc. This frequency, as heretofore mentioned, is equal to $$\frac{1}{2\pi\sqrt{LC}}$$

where L and C are the series inductance and series capacitance values in henries and farads, respectively. The scale of frequency is linear, not logarithmic, and curve A becomes substantially linear on either side of the resonant frequency, the impedance increasing substantially linearly as a function of the frequency differential between $f_r$ and the other frequencies.

In order to increase the slope of the sides of the resonance curve, as shown in curve B, and in accordance with my invention, I increase the $L/C$ ratio. If I hold other values constant, this may be accomplished by various means, for example, any one of the following:

1. Increasing the length, $D_L$ of the longer foil beyond the shorter foil.
2. Decreasing the foil width, W.
3. Decreasing the length, $D_c$, of the short foil.
4. Increasing the thickness of the dielectric spacers.
5. Decreasing the dielectric constant of the dielectric spacers.

Of course, it is possible to vary two or more of the above at one time.

The value of impedance at the resonant frequency is, of course, dependent upon the series resistance in the network. Curve C, with a minimum impedance of R' ohms is similar to curve A but is substantially uniformly lower, due to the difference between R and R', as these values are more or less independent of frequency.

For practical application, it is often desired to produce a network which has an impedance below a given value, say $Z_0$, over a certain frequency range, or, as it is generally called, band. If the lower and upper limits of this band are, for example, $f_a$ and $f_b$, respectively, the network should have a curve similar to curve A, in which the impedance is equal to or less than $Z_0$ over $f_a$—$f_b$ band. It is readily apparent that the shape of the curve is of considerable importance in the applications of series resonant network. If a narrow band of low impedance is desired, a high $L/C$ ratio is preferred. On the other hand, if a broad low impedance band is required, a low $L/C$ ratio and a low series resistance is preferable. Of course, as a general rule, I prefer to keep the series resistance low since the efficiency of the network is greater and even a very narrow band spread may be accomplished with a low resistance value.

As far as the actual materials of construction are concerned, the electrode foils may be of copper, aluminum, tin, lead and similar metals and alloys which may be rolled in thin, flexible sheets, of thickness as low as about .00017 inch. For dielectric spacing material, impregnated kraft paper is satisfactory, the impregnant being, in its normal state, a wax, oil, or polymerized resin. Resin films are also useful. Terminals may be attached by laying in a durable tab of aluminum or similar metal, or by other known means.

The wound network may be encased in a cardboard, glass, or metal container, with terminal connections provided thereon. It should be noted that the terminal tabs may be connected to the electrode foils on the same side of the winding as well as from opposite sides. Also, it is possible to connect the extended outer foil directly to a metal container, such as a metal sleeve, which may then be bolted or connected to the chassis of an electronic set, which in turn, is often grounded. In this manner, series resistance is minimized.

As a representative example of a series resonant network, I may produce in a unitary structure a network which possesses a resonant frequency of 455 kilocycles. This network employs aluminum electrode foils of 1" width and .00025" thickness. One electrode foil is 18" in length and the other foil is 35" in length. The foils are convolutely wound on a 1/8" mandrel and separated by .0009" of calendered kraft paper impregnated with chlorinated naphthalene wax. The total number of turns is 48, of which the first 29 contain both foils, superposed to produce a capacitance element. The last 19 turns contain only the longer foil and the dielectric spacer. A tab is inserted in contact with the shorter foil at the beginning of the winding, and a tab inserted in contact with the long foil at the outer extreme end of the winding, these tabs extending from opposite sides of the winding.

When measured, the above network possesses an electrical capacity of .05 microfarad and an inductance of 2.46 microhenries, which gives a resonant frequency of 455 kilocycles. At this frequency, its impedance is less than one ohm.

In contrast with the foregoing simple, compact, structure, a capacitor with .05 mfd. capacity and the inductance occurring in the lead wires, winding, etc., would resonate at about nine megacycles. It would, therefore, be necessary to add to this capacitor a coil with an inductance of about 2.39 microhenries to bring the resonant frequency down to 455 kilocycles and produce a series resonant circuit.

It is preferable to have the longer electrode foil wound a plurality of turns beyond the shorter electrode foil, although, in the case of spiral windings, even a single turn will produce excellent results.

As a general rule, I prefer to have an $L/C$ ratio (where L represents henries, and C represents farads) between the limits of about 60 to 1 and about 1 to 1. According to the preferred embodiments of my invention, the $L/C$ ratio is between about 50 to 1 and 10 to 1.

As many apparently widely different embodiments of my invention may be made without departing from the spirit and scope hereof, it

What I claim is:

1. A series resonant, two-terminal band pass circuit comprising two electrode foils of unequal length convolutely wound with each other and with dielectric spacing material to provide circuit capacitance, the longer of said foils extending for at least one turn more than the shorter foil to provide additional circuit inductance for resonating with the capacitance at the desired pass frequency, both foils having one end at about the same portion of the winding, the first of said two terminals being connected to the shorter foil at said one end, and the second of two terminals being connected to the longer foil at the other end of the winding, one of the terminals forming the signal-supplying input terminal of the circuit and the other of the terminals forming the output terminal for delivering the signals passed by the circuit, said terminals extending from opposite side edges of the wound foils.

2. A series resonant, two-terminal circuit for passing signals having a frequency of about 455 kilocycles per second, said circuit comprising two aluminum electrode foils of unequal length convolutely wound with each other and with dielectric spacing material to provide circuit capacitance, the larger of said foils extending for at least one turn more than the shorter foil to provide additional circuit inductance for resonating with the capacitance at the desired pass frequency, both foils having one end at about the same portion of the winding, the first of said two terminals being connected to the shorter foil at said one end, and the second of said two terminals being connected to the longer foil at the other end of the winding, one of the terminals forming the signal-supplying input terminal of the circuit and the other of the terminals forming the output terminal for delivering the signals passed by the circuit, said terminals extending from opposite side edges of the wound foils and the inductance in henries being between about 10 and 50 times the capacitance in farads.

WILLIAM M. ALLISON.

REFERENCES CITED

The following references are of record in the file of this patent:

UNITED STATES PATENTS

| Number | Name | Date |
|---|---|---|
| 1,942,153 | Seeley | Jan. 2, 1934 |
| 2,000,441 | Given | May 7, 1935 |
| 2,260,296 | Christopher et al. | Oct. 28, 1941 |

FOREIGN PATENTS

| Number | Country | Date |
|---|---|---|
| 340,144 | Great Britain | Dec. 24, 1930 |